3,411,991
VITAMIN B₁₂ FERMENTATION
Peter G. Lim, Elsmere, Del., assignor to Hercules Incorporated, Wilmington, Del., a corporation of Delaware
No Drawing. Filed July 8, 1966, Ser. No. 563,722
3 Claims. (Cl. 195—96)

This invention relates to a process of producing vitamin $B_{12}$ by fermentation with *Propionibacterium freudenreichii*, and more particularly to an improvement in such fermentation process which makes possible markedly increased yields of vitamin $B_{12}$.

It is known that vitamin $B_{12}$ is produced during fermentations with various propionic acid bacteria, including *Propionibacterium freudenreichii*. Such fermentation procedures, however, have not been found to be commercially satisfactory, particularly from the viewpoint of the economics of the process as a whole, since a fully commercial satisfactory process must be capable of producing initial crude products of high potencies of vitamin $B_{12}$ products in good yields within reasonable fermentation periods of time. Therefore, any means by which the yield of product can be increased will have considerable bearing on the economics of the process and hence its commercial attractiveness.

It has now been discovered in accordance with this invention that if the fermentation of a culture medium with *Propionibacterium freudenreichii* is carried out in the presence of glycine as a supplemental nutrient source, the yield of vitamin $B_{12}$ can be markedly increased. This finding was indeed unexpected since the addition of other amino acids such as analine, leucine, isoleucine, tyrosine, methionine, glutamic acid, and the like has not been found to produce the same marked increase in yield as glycine when used as a nitrogen supplement with conventional culture media, and in fact some amino acids have even been found to decrease the yield of vitamin $B_{12}$.

The culture medium which is used in the practice of the invention can be any of the media known to produce vitamin $B_{12}$ by fermentation with *Propionibacterium freudenreichii* and will contain, in addition to glycine, the usual and known sources of assimilable carbon, assimilable nitrogen, growth factors, nutrient salts, cobalt, and, if desired, cyanide ions. The assimilable carbon can be provided by carbohydrates such as dextrose, maltose, xylose, invert sugar, corn syrup, sucrose, beet, cane, or carrot molasses, starch, hydrolyzed starch, or the like, as well as by other organic compounds such as organic acids, particularly lactic acid and the like. The amount of such assimilable carbon source will usually vary from about 0.5% to about 10% by weight of the culture medium.

The source of assimilable nitrogen will usually be proteins such as those contained in soybeans, oats, corn, wheat, and other grains, and/or yeast, yeast extracts, casein digests, meat extract, blood meal, meat and bone scrap, fish meals, fish solubles, peptone, peanut meal, cotton seed meal, corn steep liquor, malt extract, malted cereal extract, distillers solubles, and the like. The assimilable nitrogen source will usually be employed in amounts of about 1% by weight or more of the medium, preferably about 1% to 5%. If desired, the fermentation can be carried out without the use of a carbohydrate, in which case the protein can serve both as the source of carbon and nitrogen required by the microorganism.

The fermentation medium can also contain such additional ingredients as a source of growth factor for the microorganism, such as, in addition to yeast and yeast extract, the extracts of potato, corn, corn steep liquor, malt and malted cereal, nutrient salts such as ammonium sulfate, magnesium sulfate, potassium phosphate dibasic, potassium phosphate monobasic, and the like; cobalt compounds, preferably in the form of a soluble salt, such as cobalt chloride, sulfate, nitrate, or the like; and a source of cyanide ion such as sodium cyanide or the like.

As pointed out above, the culture medium will contain glycine as a supplemental nitrogen source. The amount of glycine which is added to the culture medium is subject to some variation, depending upon the composition of the fermentation medium. A minor, effective amount is employed, which is usually at least about 0.05% by weight of the fermentation medium, and preferably is between 0.05% and 0.4%, and most preferably between 0.1% and 0.3% by weight of the medium. Larger amounts can be used, but there appears to be no substantial added advantage in the employment of amounts above about 2%.

The process of the invention involves fermentation of a culture medium containing glycine with *Propionibacterium freudenreichii* under either anerobic or aerobic conditions. Submerged, agitated, and aerated fermentation is ordinarily preferred for industrial operation. The pH of the fermentation medium is preferably controlled within the range of about 6.5 to 8.2 with the optimum usually being about 7.0 to 7.5. The pH can be controlled by adding dextrose, sucrose, or similar substances which are fermented to organic acids, by the addition of mineral acids, or by adding ammonium hydroxide, potassium phosphate dibasic, urea, calcium carbonate, and the like. If the pH is allowed to become too high, the higher alkalinity tends to decompose the desired end product or prevent its formation and thereby decrease the yield. If the pH is allowed to become too low, the growth of the organism is inhibited and the yield of the desired product is thereby reduced.

Fermentation is advantageously carried out at a temperature of about 28° C. to 32° C., preferably about 30° C. The inoculated medium is agitated and aerated, if desired, and fermentation is allowed to proceed until the optimum, usually the maximum, vitamin $B_{12}$ production is achieved. The vitamin $B_{12}$ content is then recovered from the fermentation medium by known methods.

The following examples demonstrate the process of the invention. It is to be understood, however, that the invention is not limited thereto nor to the specific ingredients, proportions, and procedures set forth therein and that the examples are given only for purposes of illustration. In the following examples the term "parts" refers to parts by weight unless otherwise indicated.

Examples 1–5

An aqueous fermentation medium was prepared having the following composition:

| Culture medium: | Parts |
|---|---|
| Yeast extract | 20 |
| Glucose monohydrate | 25 |
| $CoCl_2 \cdot 6H_2O$ | 0.008 |
| Tap water | 1000 |

The pH was adjusted to 6.0 with concentrated sulfuric acid and then 40 parts of calcium carbonate was added. One hundred (100) parts by volume of this medium were placed in each of 5 Erlenmeyer flasks and varying amounts of glycine ranging from zero to 0.30 parts were added to each flask, after which the flasks were covered with gauze and aluminium foil, and the flask and contents were sterilized for 15 minutes at 121° C. and then cooled. The flask contents were next inoculated at 30° C. with 10% by volume of a liquid culture of *Propionibacteria freudenreichii* (ATCC 6207) grown for 2 days in the same media in the same manner, and the fermentation allowed to proceed at 30° C. under submerged aerobic conditions by continuously stirring by means of a conventional rotary shaking machine set at 135 r.p.m. After fermentation for 6 days, the fermentation liquors were assayed for Vitamin $M_{12}$ activity turbidimetrically with *Lactobacilus leichmanii* (ATCC 7830) in accordance with the methods and procedures described in the U.S. Pharmacopeia (XVI), pp. 888–892, U.S. Pharmacopeial Convention, Inc., Washington D.C. (1960), the following results being obtained:

| Example | Parts of Glycine Added | Vitamin $B_{12}$, mg./liter |
| --- | --- | --- |
| 1 | None | 13.1 |
| 2 | 0.05 | 15.6 |
| 3 | 0.10 | 16.8 |
| 4 | 0.20 | 23 |
| 5 | 0.30 | 22 |

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. In a process for the production of vitamin $B_{12}$ by the fermentation of an aqueous culture medium with *Propionibacterium freudenreichii*, the improvement which comprises carrying out the fermentation in the presence of glycine in an amount of about 0.05% to about 2% by weight of said culture medium.

2. The process of claim 1 wherein the amount of glycine present is about 0.05% to 0.4% by weight of said culture medium.

3. The process of claim 1 wherein the amount of glycine present is about 0.1% to 0.3% by weight of said culture medium.

References Cited

UNITED STATES PATENTS 2,816,856   12/1957   Sudarsky et al. _____ 195—96

ALVIN E. TANENHOLTZ, *Primary Examiner.*